United States Patent
Chen et al.

(10) Patent No.: US 10,292,132 B2
(45) Date of Patent: May 14, 2019

(54) METHOD AND APPARATUS OF ENHANCED PAGING

(71) Applicant: MEDIATEK Singapore Pte. Ltd., Singapore (SG)

(72) Inventors: Hua-Min Chen, Beijing (CN); Min Wu, Beijing (CN); Feifei Sun, Beijing (CN); Tao Chen, Beijing (CN)

(73) Assignee: HFI Innovation INC., Hsin-Chu (TW)

( * ) Notice: Subject to any disclaimer, the term of this patent is extended or adjusted under 35 U.S.C. 154(b) by 0 days.

(21) Appl. No.: 15/806,442

(22) Filed: Nov. 8, 2017

(65) Prior Publication Data
US 2018/0070332 A1 Mar. 8, 2018

Related U.S. Application Data

(63) Continuation of application No. PCT/CN2016/082648, filed on May 19, 2016.

(51) Int. Cl.
*H04W 68/02* (2009.01)
*H04W 68/00* (2009.01)
(Continued)

(52) U.S. Cl.
CPC ............ *H04W 68/02* (2013.01); *H04W 4/70* (2018.02); *H04W 68/005* (2013.01); *H04W 72/042* (2013.01); *H04W 68/025* (2013.01)

(58) Field of Classification Search
CPC ............ H04W 24/08; H04W 72/0453; H04W 72/0446; H04W 72/0433; H04W 72/0413; H04W 72/042; H04W 72/04; H04W 72/02
See application file for complete search history.

(56) References Cited

U.S. PATENT DOCUMENTS

| | | | |
|---|---|---|---|
| 2010/0190514 A1 | 7/2010 | Laroia et al. | 455/458 |
| 2012/0281566 A1 | 11/2012 | Pelletier et al. | 370/252 |

(Continued)

FOREIGN PATENT DOCUMENTS

| | | | |
|---|---|---|---|
| CN | 103379552 A | 4/2012 |
| CN | 103580783 A | 7/2012 |

(Continued)

OTHER PUBLICATIONS

EPO, search report for the EP patent application 16795888.3 dated Dec. 19, 2017 (11 pages).
3GPP TSG RAN WG1 Meeting #81 R1-153335, MediaTek Inc., "MTC narrow-band discussion and resource allocation design", Fukuoka, Japan, May 25-29, 2015 (3 pages).

(Continued)

*Primary Examiner* — Julio R Perez
(74) *Attorney, Agent, or Firm* — Imperium Patent Works; Helen Mao

(57) ABSTRACT

Methods and apparatus are provided for paging enhancement for the UE in the LC-MTC mode. In one novel aspect, the UE determines if the UE is in CE mode, obtains a set of narrow-band resource blocks reserved for LC-MTC paging messages and decodes a paging message based on the obtained narrow-band resource blocks. In one embodiment, the paging message occupies a predefined narrow band resource blocks without control information. In another embodiment, MPDCCH is used as control message to schedule narrow-band paging messages. In one embodiment, the MPDCCH searching space comprises a paging narrow-band selected from the set of narrow bands based on a UE ID. In another novel aspect, methods for PO detection are provided. The UE obtains a set of common paging narrow-bands from a higher layer configuration, determines a paging occasion to monitor paging message, decodes paging messages within the obtained common paging narrow-band, and performs combination.

19 Claims, 11 Drawing Sheets

(51) Int. Cl.
*H04W 4/70* (2018.01)
*H04W 72/04* (2009.01)

(56) References Cited

U.S. PATENT DOCUMENTS

| | | | |
|---|---|---|---|
| 2016/0227513 A1* | 8/2016 | Vajapeyam | H04W 68/005 |
| 2016/0309282 A1* | 10/2016 | Xu | H04W 4/005 |
| 2017/0013391 A1* | 1/2017 | Rico Alvarino | H04W 4/70 |
| 2017/0201963 A1* | 7/2017 | Zhang | H04W 68/02 |

FOREIGN PATENT DOCUMENTS

| | | |
|---|---|---|
| EP | 3160200 A1 | 6/2014 |
| EP | 3282768 A1 | 5/2015 |
| WO | WO02015199422 A1 | 6/2014 |
| WO | WO02016182391 A1 | 5/2015 |

OTHER PUBLICATIONS

3GPP TSG RAN WG1 Meeting #80bis R1-151728, ZTE, "Detailed design on Physical downlink control channel for MTC enhancement", Belgrade, Serbia, Apr. 20-24, 2015 (8 pages).

International Search Report and Written Opinion of International Search Authority for PCT/CN2016/082648 dated Jul. 26, 2016 (11 pages).

3GPP TSG RAN WG1 Meeting #81 R1-153335, MediaTek Inc., MTC narrow-band discussion and resource allocation design, Fukuoka, Japan dated May 25-29, 2015 (3 pages).

3GPP TSG RAN WG1 Meeting #80 R1-150064, Huawei et al., Paging transmission for MTC UEs, Athens, Greece dated Feb. 9-13, 2015 (3 pages).

3GPP TSG-RAN WG1 Meeting #81 R1-152553, Nokia Networks, Paging Transmission for MTC, Fukuoka, Japan dated May 25-29, 2015 (one page).

EPO, search report for the EP patent application 16795888.3 dated Jan. 21, 2019 (6 pages).

* cited by examiner

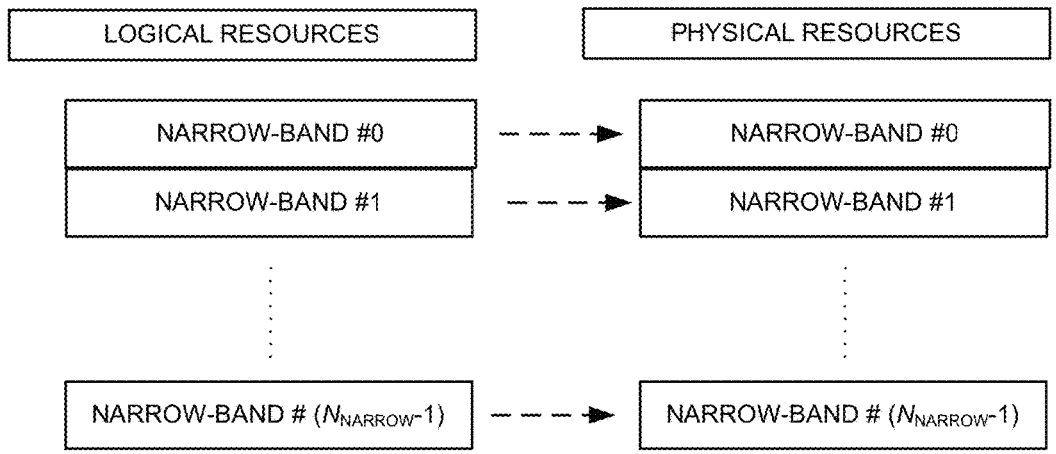
FIG. 6
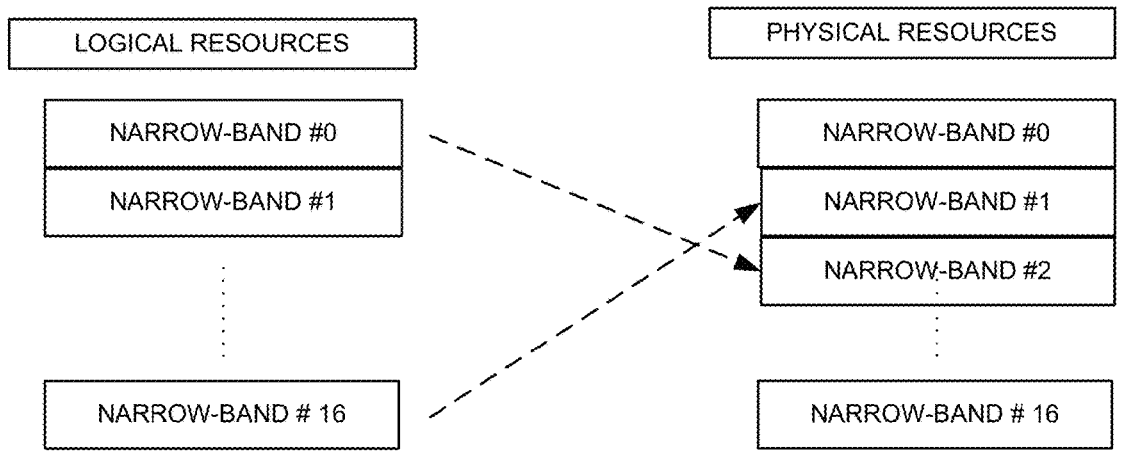
FIG. 7
| INDEX | NARROW-BAND INDEX |
|---|---|
| 0 | NARROW-BAND #2 |
| 1 | NARROW-BAND #5 |
| 2 | NARROW-BAND #4 |
| 3 | NARROW-BAND #9 |
INDEX = (2 MOD16) MOD 4 =2
FIG. 8

METHOD AND APPARATUS OF ENHANCED PAGING

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2016/082648, with an international filing date of May 19, 2016, which in turn claims priority from PCT Application Number PCT/CN2015/079187, entitled, "METHOD AND APPARATUS OF ENHANCED PAGING" filed on May 18, 2015. This application is a continuation of International Application No. PCT/CN2016/082648, which claims priority from International Application No. PCT/CN2015/079187. International Application No. PCT/CN2016/082648 is pending as of the filing date of this application, and the United States is a designated state in International Application No. PCT/CN2016/082648. This application claims priority under 35 U.S.C. § 120 and § 365(c) from International Application Number PCT/CN2015/079187 filed on May 18, 2015. The disclosure of each of the foregoing documents is incorporated herein by reference.

TECHNICAL FIELD

The disclosed embodiments relate generally to wireless communication, and, more particularly, to enhanced paging for low cost (LC) machine type communication (MTC) UEs.

BACKGROUND

Machine-Type Communication (MTC) is an important revenue stream for operators and has a huge potential from the operator perspective. Lowering the cost of MTC user equipment (UEs)/devices is an important enabler for the implementation of the concept of "internet of things" (IOT). Many MTC devices are targeting low-end (low average revenue per user, low data rate) applications that can be handled adequately by GSM/GPRS. Due to the limitations and repeatedly transmission requirement, LC-MTC UEs with or without coverage enhancement, and the UEs in CE mode cause larger overhead for signaling processes, such as the paging process. In order to ensure that there is a clear business benefit to MTC UE vendors and operators for migrating low-end MTC devices from GSM/GPRS to LTE networks, there are many discussions within 3GPP scope about a new type of terminal, i.e. a low cost (LC) MTC UE, from Rel-11 to Rel-13. The cost of the LC-MTC UE is tailored for the low-end of the MTC market to be competitive with that of GSM/GPRS terminals. The LC-MTC UEs are characterized by: 1) One Rx antenna; 2) Downlink and uplink maximum TBS size of 1000 bits; 3) Bandwidth reduction—resources for each channel transmission are limited to contiguous 6 PRBs (1.4 MHz) for cost reduction, and 4) Coverage enhancement (CE)—some applications of LC-MTC UEs will require 15-20 dB coverage extension and repeated transmission is a common technique to compensate penetration losses. Due to the limitations and repeatedly transmission requirement, LC-MTC UEs with or without coverage enhancement, and the UEs in CE mode cause larger overhead for signaling processes, such as the paging process.

In a wireless network like LTE/LTE-A, one main purpose of a paging message is to page UEs for RRC connections. The paging message can be also used to inform UEs of system-information (SI) update, wherein SI comprises master information block (MIB), system information block-1 (SIB-1) and other SIB-x (SIB-2~SIB-16 For UEs in the LC MTC mode where the data blocks are repeatedly transmitted, it adds a large overhead and degrades UE battery life. Further, since a paging message is broadcasted, the repeated transmission adds system overheads to a large number of cells as well.

Enhancement of the paging messages and procedures are needed for LC MTC mode UEs.

SUMMARY

Methods and apparatus are provided for paging enhancement for the UE in the LC-MTC mode. In one novel aspect, the UE determines if the UE is in CE mode in a wireless communication system. The UE obtains a set of narrow-band resource blocks reserved for LC-MTC paging messages and decodes a paging message based on the reserved set of narrow-band resource blocks. In one embodiment, the paging message occupies a predefined narrow band resource blocks without control information. In one embodiment, the narrow-bands are obtained from a higher layer message, wherein comprising the narrow-band index. In another embodiment, the paging message is decoded based on a higher-layer paging resource configuration. In another embodiment, MPDCCH is used as a control message to schedule narrow-band paging messages. In one embodiment, the MPDCCH searching space comprises a paging narrow-band, and the paging narrow-band is selected from the set of narrow bands based on a UE ID. In yet another embodiment, the UE ID is a function of IMSI, S-TMSI, UE specific P-RNTI or multicast P-RNTI shared by a group of UE. In one embodiment, before decoding a second paging message, the UE further checks if frequency hopping is enabled.

In another novel aspect, methods for PO detection are provided. The UE obtains a set of common paging narrow-bands from a higher layer configuration by a UE in a mobile communication system, determines a paging occasion to monitor paging message, decodes paging messages within the obtained common paging narrow-band, and performs combination. In one embodiment, the UE determines if a number of virtual PO is indicated in DCI. In another embodiment, the UE obtains the narrow-bands for the number of the virtual POs, and decoding a second paging message at one of the number of the virtual POs if the number of virtual POs is indicated.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 6 show an exemplary of mapping rule using a localized mapping in accordance with embodiments of this invention.

FIG. 7 show an exemplary of mapping rule using a distributed mapping in accordance with embodiments of this invention.

FIG. 8 shows one example to determine a paging narrow-band by a predefined rule in accordance with embodiments of this invention.

DETAILED DESCRIPTION

Reference will now be made in detail to some embodiments of the invention, examples of which are illustrated in the accompanying drawings.

Figure 1:
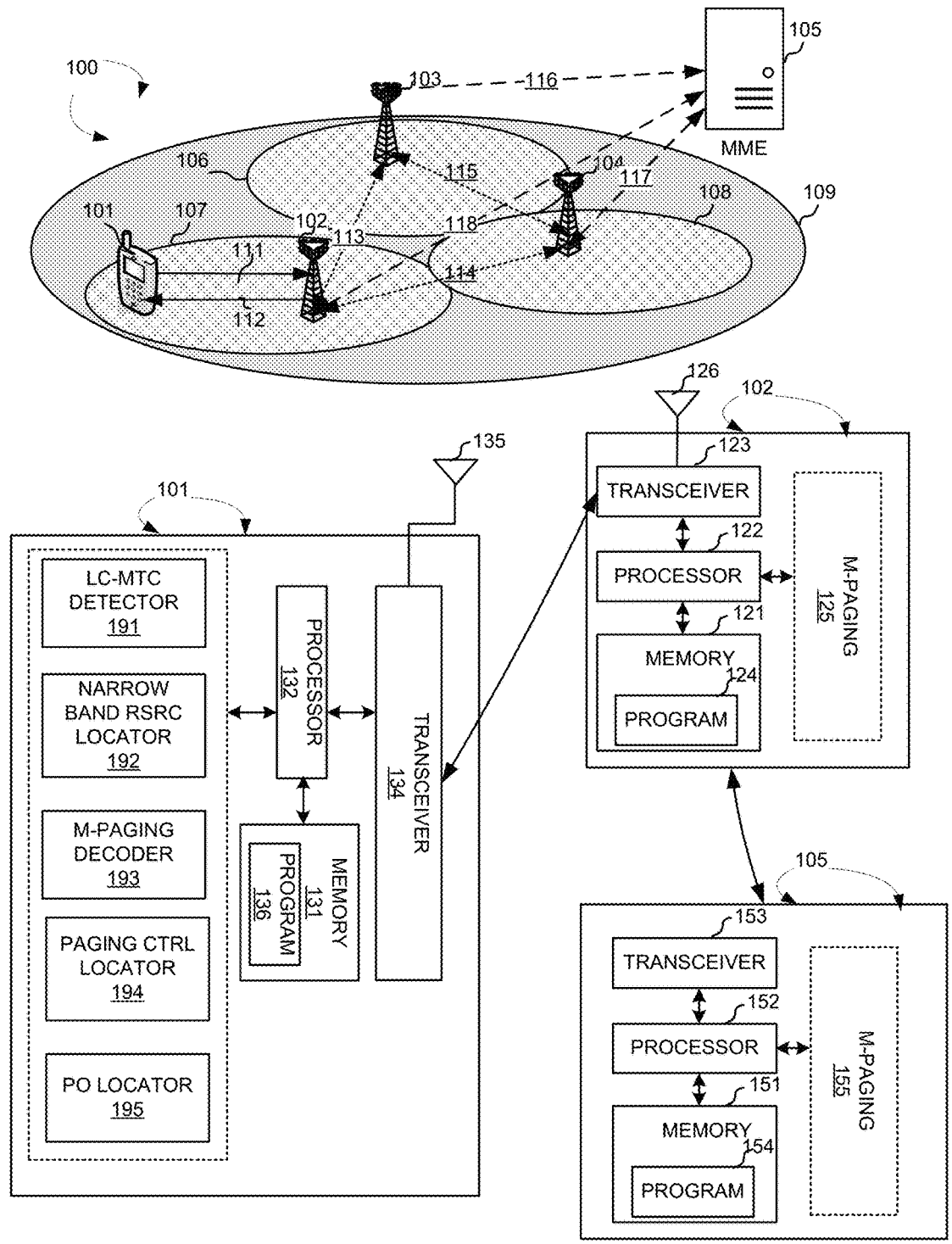
FIG. 1 illustrates an exemplary mobile communication network with low cost MTC UEs in accordance with embodiments of the current invention.

FIG. 1 illustrates an exemplary mobile communication network 100 with low cost MTC UEs in accordance with embodiments of the current invention. Wireless communication system 100 includes one or more fixed base infrastructure units, such as base stations 102 103, and 104, forming a network distributed over a geographical region. The base unit may also be referred to as an access point, an access terminal, a base station, a Node-B, an eNode-B, or by other terminology used in the art. Each of the base stations 102, 103, and 104 serves a geographic area such as cell 107, 106, and 108, respectively. Backhaul connections 113, 114 and 115 connect the non-co-located base stations, such as 102, 103, and 104. These backhaul connections can be either ideal or non-ideal.

A mobile station 101 in wireless network 100 is served by base station 102 via uplink 111 and downlink 112. In one embodiment, mobile communication network 100 is an OFDM/OFDMA system comprising a base stations eNBs 102, 103 and 104, and a plurality of mobile stations, such as mobile station 101. When there is a downlink packet to be sent from eNodeB to mobile station, each mobile station gets a downlink assignment, e.g., a set of radio resources in a physical downlink shared channel (PDSCH). When a UE needs to send a packet to eNodeB in the uplink, the mobile station gets a grant from the eNodeB that assigns a Physical Uplink Shared Channel (PUSCH) consisting of a set of uplink radio resources. The mobile station gets the downlink or uplink scheduling information from a Physical Downlink Control Channel (PDCCH) or an enhanced Physical Downlink Control Channel (EPDCCH) that is targeted specifically to that mobile station. The downlink or uplink scheduling information and the other control information, carried by PDCCH, is referred to as downlink control information (DCI).

A network entity, such as a mobility management entity (MME) 105 is connected with base stations such as base station 102, 103, and 104, via links of 116, 117, and 118. In wireless network 100, paging procedures are initiated by a network entity such as MME 105. One or more cells form a tracking area for a UE. For example, a track area 109 is formed for UE 101 including cells 106, 107 and 108, served by base stations 103, 102 and 104, respectively.

FIG. 1 further shows simplified block diagrams of mobile 101, base station 102, and MME 105 in accordance with the current invention. MME 105 has a transceiver module 153, receives signals from links with base stations, and sends them to processor 152. Transceiver 153 receives signals from processor 152, and sends out to links to the base stations. Processor 152 processes the received signals and invokes different functional modules to perform features in MME 105. Memory 151 stores program instructions and data 154 to control the operations of MME 105. MME 105 also includes a set of control modules, such as M-paging module 155 that carry out functional tasks to communicate with mobile stations.

Base station 102 has an antenna 126, which transmits and receives radio signals. A RF transceiver module 123, coupled with the antenna, receives RF signals from antenna 126, converts them to baseband signals and sends them to processor 122. RF transceiver 123 also converts received baseband signals from processor 122, converts them to RF signals, and sends out to antenna 126. Processor 122 processes the received baseband signals and invokes different functional modules to perform features in base station 102. Memory 121 stores program instructions and data 124 to control the operations of base station 102. Base station 102 also includes a set of control modules, such as M-paging module 125 that carry out functional tasks to communicate with mobile stations.

Mobile station 101 has an antenna 135, which transmits and receives radio signals. A RF transceiver module 134, coupled with the antenna, receives RF signals from antenna 135, converts them to baseband signals and sends them to processor 132. RF transceiver 134 also converts received baseband signals from processor 132, converts them to RF signals, and sends out to antenna 135. Processor 132 processes the received baseband signals and invokes different functional modules to perform features in mobile station 101. Memory 131 stores program instructions and data 136 to control the operations of mobile station 101.

Mobile station 101 also includes a set of control modules that carry out functional tasks. A LC-MTC detector 191 detects a LC MTC mode of the UE. A narrow-band resource locator 192 obtains a set of narrow-band resource blocks reserved for LC-MTC paging messages. A MTC paging (M-paging) decoder 193 decodes a paging message based on the reserved set of narrow-band resource blocks. A paging-control locator 194 obtains a MTC physical down link control channel (MPDCCH) search space based on the set of narrow-bands and decodes the paging message after obtaining scheduling information within the MPCCH searching space. A paging opportunity (PO) locator 195 determines a paging occasion to monitor paging message and checks if a number of virtual PO is indicated in DCI.

Legacy paging messages causes large overhead for LC MTC UEs and shortens the battery life. Therefore, MTC paging message (M-paging) is desired. The first issue to use the modified paging mechanism is to determine whether the M-paging message or process applies to the UE. The UE needs to determine whether the UE is in the LC MTC mode. A UE can be categorized as a normal UE or a LC-MTC UE. A LC-MTC UE operates in the LC MTC mode, which has limited TBS size and bandwidth. A normal UE without coverage extension operates in the normal mode, which has the normal TBS size a bandwidth. A normal UE may operate either in a normal mode or in a CE mode. In one embodiment of the current invention, the UE operates in the CE mode is considered to be in the LC MTC mode, which may require repeatedly transmission just as a LC-MTC UE.

Figure 2:
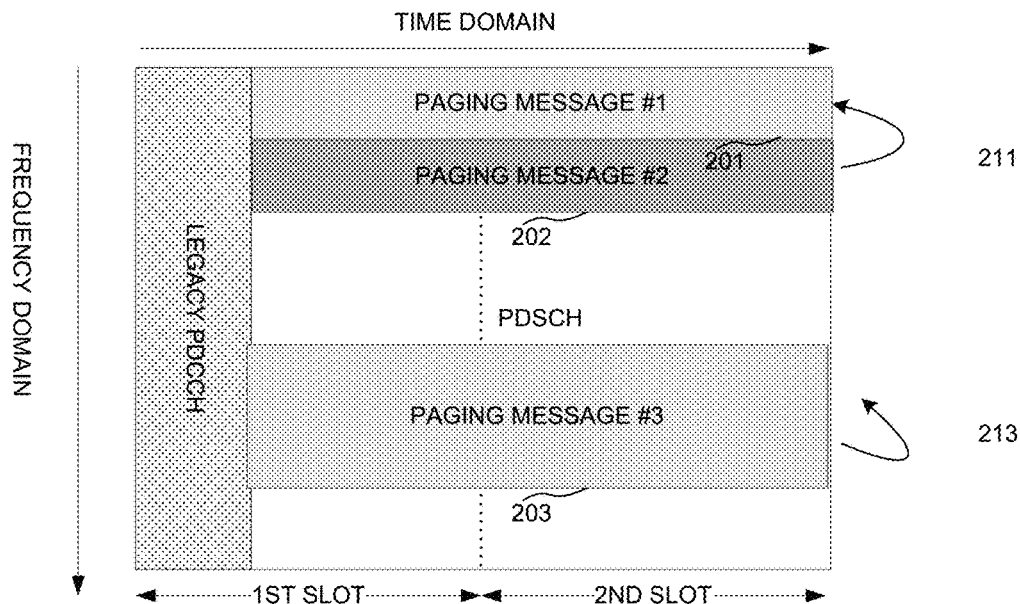
FIG. 2 shows some examples of some narrow band configuration for paging in accordance with embodiments of this invention.

FIG. 2 shows some examples of some narrow band configuration for paging in accordance with embodiments of this invention. Within a paging narrow-band 211, there are two paging messages 201 and 202, while only one paging message 203 is transmitted within a paging narrow-band 213. In the current example, a paging narrow-band occupies six PRB pairs and a basic resource granularity is of three PRB pairs.

The paging narrow-band(s) can be configured or reconfigured by a higher layer message in one embodiment. The higher layer message can be broadcast in one embodiment. The higher-layer can be a UE-specific message in another embodiment. For example, a broadcast higher layer message like SIB2 for LC MTC UEs configures a set of DL narrow-bands dedicated for paging message transmission from a starting point in time domain. Here, a starting point for paging message is named as a Paging Occasion (PO). M-Paging is repeated at following available subframes configured by the higher layer message. In one embodiment, MTC paging (M-Paging) is repeated within the PO. After RRC connection setup, one or more UE-specific paging narrow-bands can be (re)configured by a UE-specific higher layer message. Then, the UE can monitor its paging message within the configured UE-specific paging narrow-bands. The same UE-specific paging narrow-bands can be configured to multiple UEs. In this design option, the number of configured paging narrow-bands can be a multiple times of the number of POs, or the same as the number of PO within a paging radio frame, which is only one paging narrow-band from the configured set is used within one PO. More narrow-bands for paging within the same PO can be derived from the configured one paging narrow-band by a predefine rule. In another embodiment, all configured paging narrow-bands are used within one PO. To reduce signaling overhead, the number of configured paging narrow-bands could be restricted.

In a second design option, a set of dedicated paging narrow-bands are specified. For example, a narrow-band with six PRB pairs at one channel edge is reserved for paging message transmission and used for other information transmission if there is no paging message.

In a third design option, paging narrow-bands are derived from a predefined rule. For example, a specific narrow band is fixed or configured, and several paging narrow-bands are obtained by adding a shift to the specific narrow-band. The shift value can be a function of at least one of the following parameters like UE ID, UE CE level, etc. The UE ID can be a function of IMSI, S-TMSI, a UE-specific P-RNTI, or a multicast P-RNTI shared by a group of UEs, etc.

Figure 3:
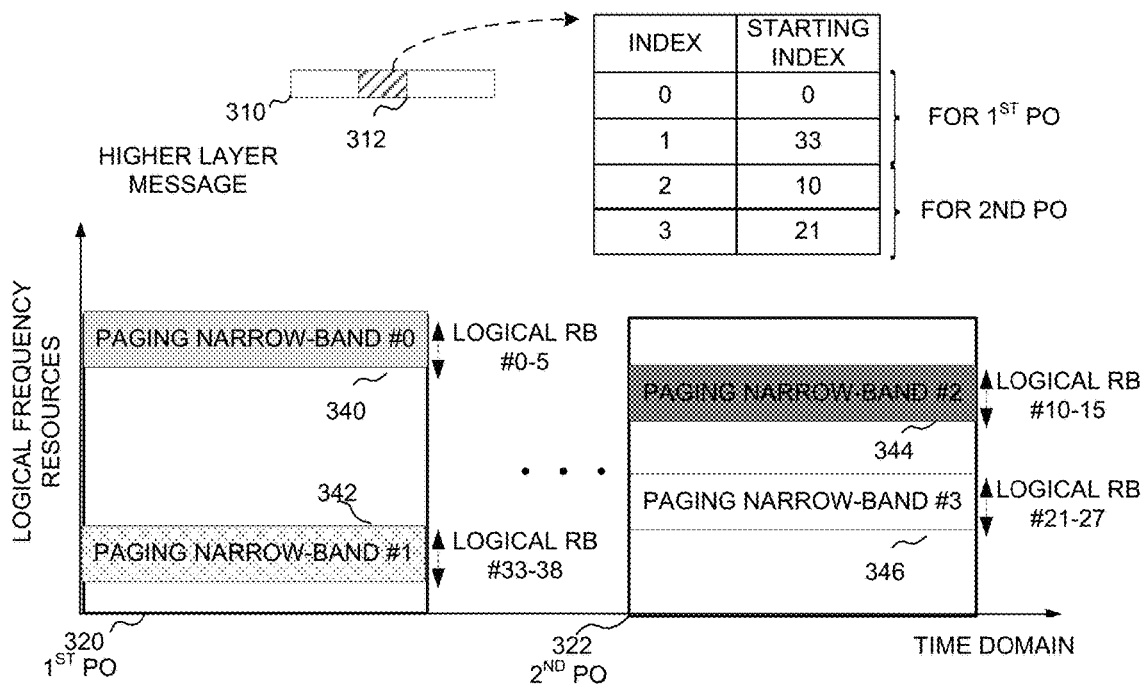
FIG. 3 shows an exemplary paging narrow-band configuration with a higher-layer message in accordance with embodiments of this invention.

FIG. 3 shows an exemplary paging narrow-band configuration with a higher-layer message in accordance with embodiments of this invention. Within a higher layer message 310, an indicator 312 configures a set of four paging narrow-bands for two POs. Then, within the first PO, narrow-band #0 starting from logical RB pair-0 to logical RB pair-5 (resource 340) and narrow-band #1 starting from logical RB pair-33 to logical RB pair-38 (resource 342) are used. For resource 344 i.e., narrow-band #2 starts from logical RB pair-10 to logical RB pair-15. For resource 346, narrow-band #3 starting from logical RB pair-21 to logical RB pair-27, are used within the second PO.

Figure 4:
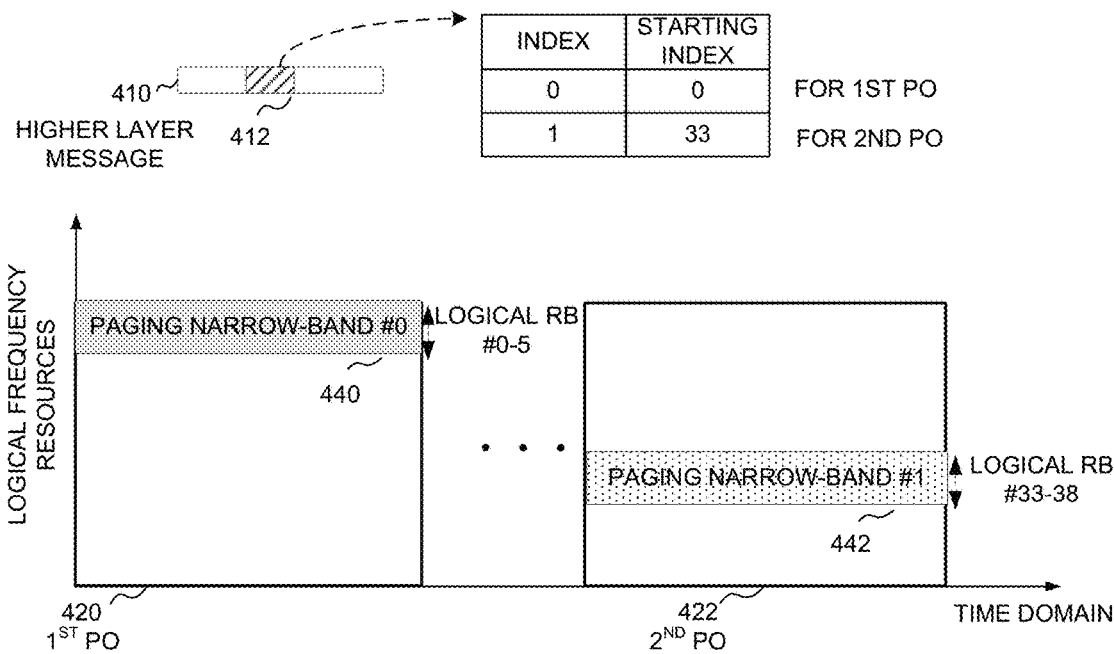
FIG. 4 shows an exemplary paging narrow-band configuration with an indicator from a higher-layer message in accordance with embodiments of this invention.

FIG. 4 shows an exemplary paging narrow-band configuration with an indicator from a higher-layer message in accordance with embodiments of this invention. A set of two paging narrow-bands are informed to the UE by an indicator 412 within a higher layer message 410. Paging narrow-band #0, resource 440 starts from logical RB pair-0 to logical RB pair-5. Narrow-band #1, resource 442 starts from logical RB pair-33 to logical RB pair-38. Narrow band #0 and narrow band #1 are used within the first PO and the second PO, respectively.

Figure 5:
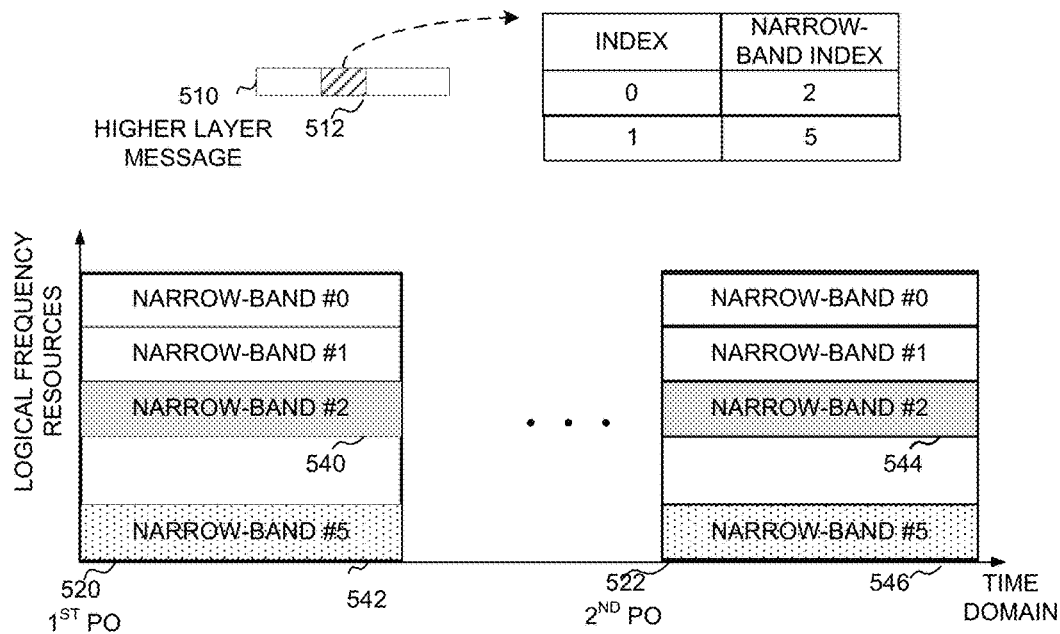
FIG. 5 shows an exemplary paging narrow-band configuration with all resources available in each PO in accordance with embodiments of this invention.

FIG. 5 shows an exemplary paging narrow-band configuration with all resources available in each PO in accordance with embodiments of this invention. A set of two paging narrow-bands are configured by an indicator 512 within a higher layer message 510. All configured resources can be used within each PO. In this example, two narrow-band indexed #2 and #5 are selected from a set of logical narrow-bands. There are paging message 540 and 542 in narrow-band #2 and #5 at the first PO 520, respectively. There are paging message 544 and 546 in narrow-band #2 and #5 at the second PO 522, respectively.

The configured narrow-bands are logical resources, and mapped to physical narrow-bands according to a mapping rule in one design option. In one embodiment, the physical narrow-band depends on eNB scheduling. In another embodiment, the physical narrow-bands are obtained by dividing the whole system bandwidth by a division rule. The division rule can specify such that the whole system bandwidth is divided into several narrow-bands from a channel edge in one embodiment. In another embodiment, the division rule can specify that the whole system bandwidth is divided into several narrow-bands from some contiguous central PRB pairs. The number of narrow-bands by division can be expressed as $N_{narrow} = \lceil WBW/NBW \rceil$, wherein $N_{narrow}$ denotes the number of narrow-bands, WBW is the bandwidth of whole system, and NBW is the bandwidth of a narrow-band.

The mapping rule between logical narrow-band and physical narrow-band is localized in one embodiment. That means logical narrow-band and physical narrow-band have same index. In another embodiment, the mapping rule between logical narrow-band and physical narrow-band is distributed. That means the logical narrow-band and the physical narrow-band have different index. One design option is a physical narrow-band is obtained by adding a shift to the index of logical narrow-band. The shift value is a function of cell ID in one example, and expressed as $I_{phy}=(I_{logical}+N_{cell}^{ID} \mod N_{narrow}) \mod N_{narrow}$, wherein $I_{phy}$ and $I_{logical}$ are the index of a physical narrow-band and a logical narrow-band, $N_{cell}^{ID}$ is the cell ID.

FIG. 6 show an exemplary of mapping rule using a localized mapping in accordance with embodiments of this invention. A localized mapping is used, i.e., a logical narrow-band is mapped to a physical narrow band with the same index. The logical resources are mapped one to one to physical resources using a localized rule.

FIG. 7 show an exemplary of mapping rule using a distributed mapping in accordance with embodiments of this invention. A distributed mapping with a function of cell ID is used. In this example, a system with a bandwidth 20 MHz and a cell ID-2 is assumed. Then, each logical narrow-band maps to a physical narrow-band by adding a shift value two to the logical index. If there are 17 narrow bands, the last logical narrow band resource, narrow band #16 is mapping to physical resources, narrow band #1, which has a shift of 2 narrow bands.

Considering an application of a massive number of LC MTC UEs, the number of UEs paged at the same PO is quite limited. Further, if multiple UEs multiplex within the same paging message, a higher blocking rate can be also expected since a long repetition is expected in case of a large CE requirement. To solve this problem, multiple paging narrow-bands are allocated at the same starting point to receive paging message or control signaling for paging message reception without introducing additional PO number at time domain, in a first novel aspect. The starting point is a determined PO according to a predefined rule. In legacy LTE systems, there is only one PO within a paging cycle for one UE. At one starting point, one UE detects paging or scheduling signaling for paging within one paging narrow-band, and a number of UEs are paged within different paging narrow-bands.

In a first design option, the UE determines a paging narrow-band, according to a predefined narrow-band determination rule, from a set of paging narrow-bands, which are configured by a higher layer message, or specified, or known to UEs without signaling. In one embodiment, the predefined narrow-band determination rule is a function of UE ID. For example, the selected paging narrow-band is obtained by following expression: I=UEID%M, wherein I is a narrow-band index within the configured set, M is the number of configured/specified paging narrow-bands, or the number of the set of narrow-bands known to UE without configuration (e.g., $M=N_{narrow}$). The UE ID can be a function of IMSI, S-TMSI, and an UE-specific or group specific P-RNTI, etc. Further, the UE ID calculation is a function of a maximal UE number within a paging message.

In a second embodiment, by adding a UE-specific shift, a UE-specific paging narrow-band is derived from a configured narrow-band by a broadcast message, or a specified paging narrow-band. For example, the broadcast message configures a paging narrow-band, and the UE obtains its own paging narrow-band by adding a shift, calculated as $\Delta=UEID \mod N_{max}$, wherein $\Delta$ is the shift, $N_{max}$ is a maximal UE number within a paging message.

In a third embodiment, the predefined narrow-band determination rule is a function of UE CE level. For example, a group of CE level are specified, like {0 dB, 5 dB, 10 dB, 15 dB}, and several sets of paging narrow-bands are configured or predefined for each CE level. The UE can select one set of narrow-bands based on its CE level. Further, based on UE ID, the UE determines one paging narrow-band from the selected set of narrow-bands according to a predefined rule like the first design option, if there are more than one narrow-band for each set.

In a fourth embodiment, one or more paging narrow-bands are indicated to the UE via a dynamic control signaling within M-PDCCH, wherein the indicated paging narrow-bands is selected from a set of configured or predefined paging narrow-bands. In a fifth embodiment, one or more paging narrow-bands are obtained directly from a higher layer message.

FIG. 8 shows one example to determine a paging narrow-band by a predefined rule in accordance with embodiments of this invention. In FIG. 8, a set of four paging narrow-band (indexed 0-3) is known to UE by configuration. Assuming the IMSI value of the UE is two and a maximal number is sixteen in this example, an index of two is obtained, i.e., paging narrow-band #4 is determined by the UE.

In another novel aspect, additional resources for paging at time domain are introduced, in additional to frequency resources. The PO number within a radio frame or within a paging cycle is increased. One paging cycle should accommodate enough subframes for repetitions. The paging cycle should be extended compared to legacy paging cycles. In one novel aspect, the frequency locations of paging messages at different POs within one paging cycle are identical or different from each other in another novel aspect. For differentiation, a PO that can be determined by a predefined rule is named an actual PO, and a PO that is determined by other signaling is named as a virtual PO.

In a first design option, more than one actual PO for one UE is introduced by a predefined rule. That is a UE can monitor multiple actual POs within a paging cycle. The parameters of the predefined rule can be from higher layer configurations, and comprise at least UE ID, UE CE level, etc.

In a second design option, additional virtual POs are introduced by a paging message, which is obtained from an actual PO. For one UE, there is only one actual PO within a paging cycle and multiple virtual POs within a paging cycle. In a first embodiment of the second design option, at the determined actual PO, a first paging message indicates that there is a second paging at following second virtual PO with a gap between the first determined actual PO. Further, at a second virtual PO, the second paging message indicates that there is a third paging at following third virtual PO with a same gap. The gap, a distance between every two POs, is predefined or configured by a higher layer message. The UE will stop monitoring paging if it is paged by the paging message within the determined PO, otherwise the UE will continue to perform monitoring. In a second embodiment of the second design option, the total number of the virtual POs following the current determined PO is indicated by the paging message within the determined PO. The locations of virtual POs are predefined and associated with the determined actual PO location (e.g. a gap).

Figure 9:
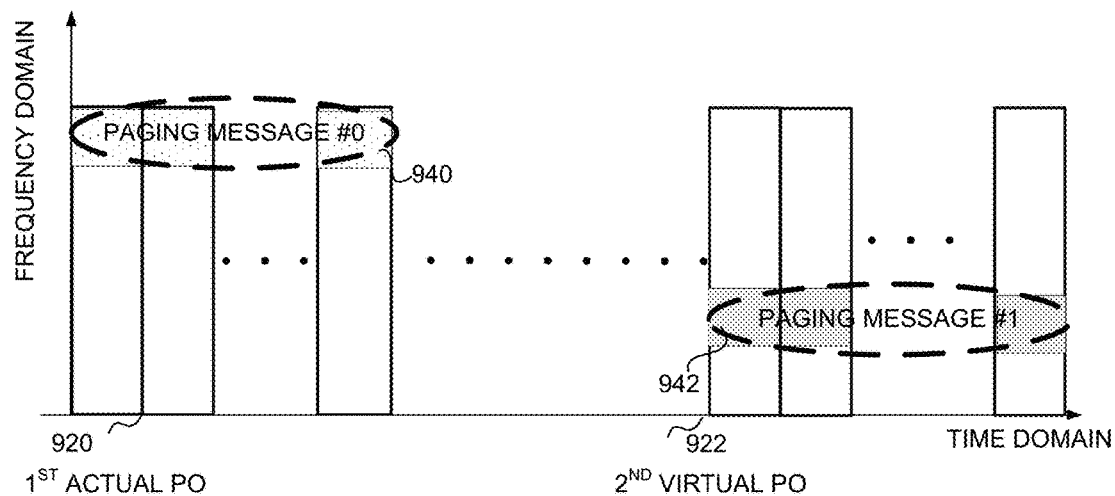
FIG. 9 illustrates an exemplary of paging message transmission without M-PDCCH with one virtual PO in accordance with embodiments of the current invention.

FIG. 9 illustrates an exemplary of paging message transmission without M-PDCCH with one virtual PO in accordance with embodiments of the current invention. For the first paging message #0 940 of the first actual PO, its starting point in time domain is starting point 920 by a predefined rule. The first paging message #0 940 indicates that there is another paging message at starting point 922. If the UE is not paged with the first paging message #0 940, the UE will monitor the paging message #1 942 at starting point 922. The starting point 922 is a logical value obtained from the point 920, or the logical value between starting point 922 and starting point 920 is a function which could be determined, so at the starting point 922, the UE could detect the paging message for itself, for example, paging message #1 942.

Figure 10:
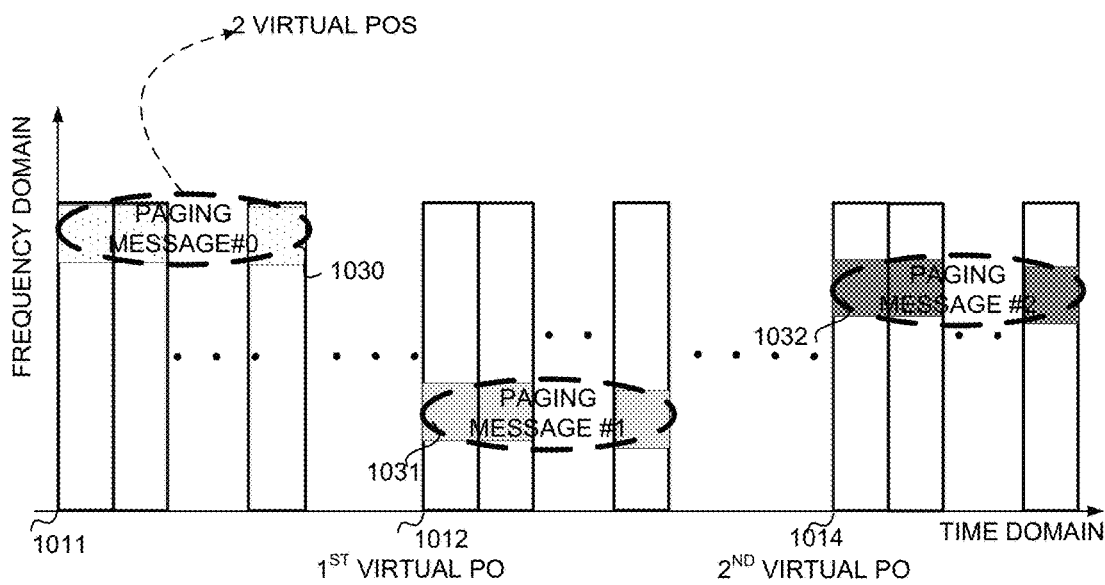
FIG. 10 illustrates an exemplary of paging message transmission without M-PDCCH with two virtual POs in accordance with embodiments of the current invention.

FIG. 10 illustrates an exemplary of paging message transmission without M-PDCCH with two virtual POs in accordance with embodiments of the current invention. At a determined actual PO 1011, paging message #0 1030 indicates the total number of POs with a paging cycle, for example, two virtual POs. Then, the UE know there are another two paging messages for monitoring if it is not paged within paging message #0 1030. The UE obtains the starting point of paging message #1 1031 with a predetermined gap from 1011, the starting point 1012 is a logical value with a relationship between starting point 1012 and starting point 1011, or the logical value between starting point 1012 and starting point 1011 is a function which could be determined, so at the starting point 1012, the UE could detect the paging message, for example, paging message #1 1031. In one novel aspect, the frequency location of paging message #1 1031 is the same as paging message #0 1030, in another novel aspect, the frequency location of paging message #1 1031 is different from paging message #0 1030, e.g. with a shift. The distance between the starting point 1014 and the starting point 1012 could be the same with the distance between the starting point 1012 and starting point 1011. In this case, the second virtual PO starts from the starting point 1014, and UE detects the paging message, for example, paging message #1 1032.

Figure 11:
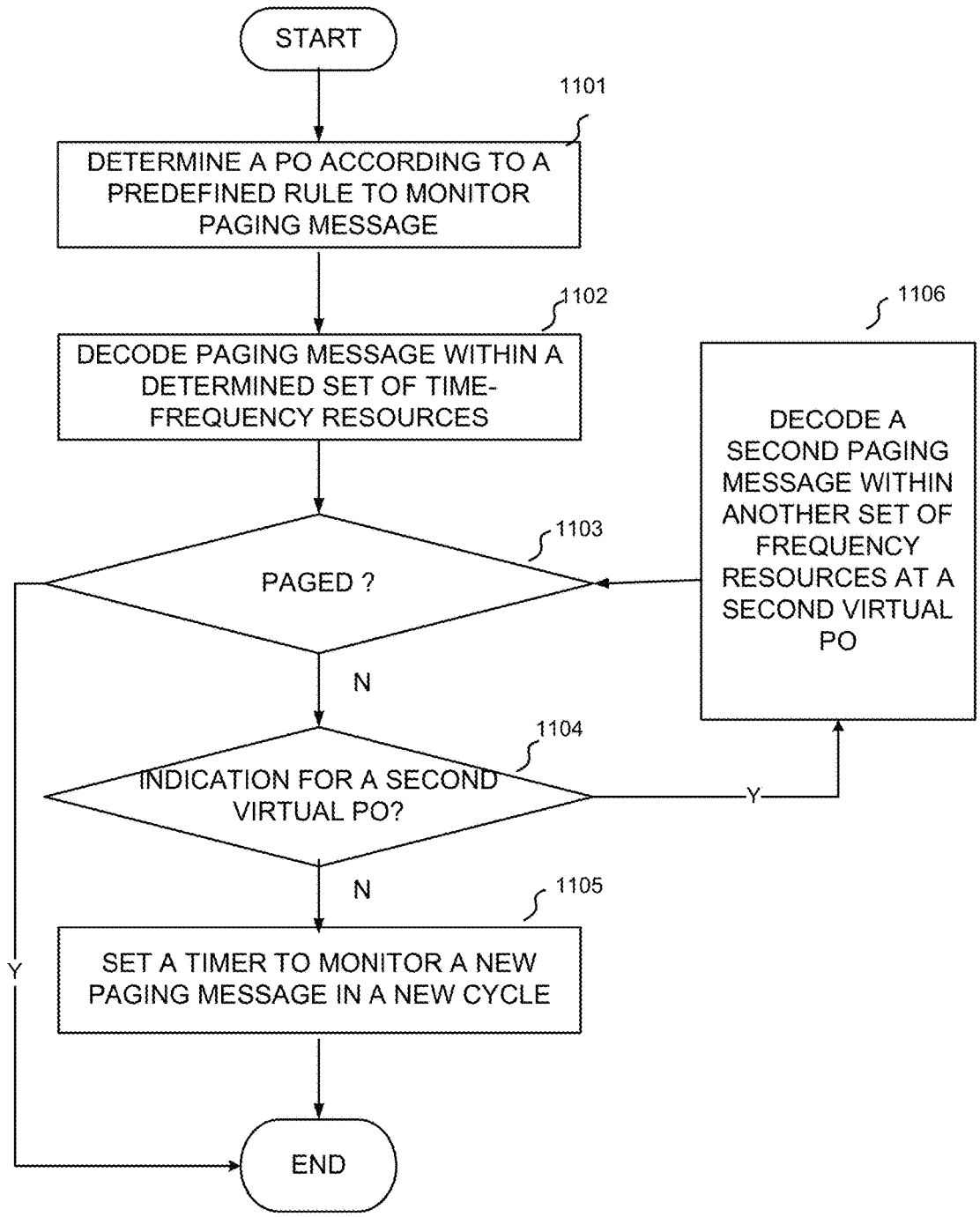
FIG. 11 illustrates an exemplary method flow of UE reception procedure according to the embodiment of FIG. 9 this invention

FIG. 11 illustrates an exemplary method flow of UE reception procedure according to the embodiment of FIG. 9 this invention. First, UE determine a PO in step 1101. UE decodes the paging message within a determined set of time-frequency resources in step 1102. Subsequently, UE checks if the paging for itself in this PO in step 1103. If yes, the UE ends the procedure. If no, the UE further checks if there is any indication for a second virtual PO in step 1104. If yes in step 1104, the UE goes to step 1106 to decode a second paging message within another set of frequency resources at a second virtual PO, then goes back to step 1103 to determine if the UE is paged by the second paging message. If no in step 1104, the UE goes to step 1105 to set a timer to monitor a new paging message in a new cycle, and end the procedure. In another implementation, there is no other virtual POs except the PO and the second virtual PO, so after step 1106, the UE goes back to step 1103 to determine if the UE is paged by the second paging message, and then ends the procedure, which means omitting the determination for another virtual PO.

In one embodiment, additional virtual paging occasions are indicated by a control signaling at a paging monitoring point. That is paging DCI for scheduling paging message indicates the number of additional virtual POs in one embodiment. In another embodiment, DCI indicates whether there is more than one PO within this paging cycle. In one case, the paging DCI is transmitted within M-PDCCH CSS. M-PDCCH CSS is transmitted within a common resource region to schedule or transmit broadcast/multi-cast/uni-cast data. The paging monitoring point is obtained from a predefined rule, and is ahead of a starting point for paging transmission. The transmission windows of paging messages at each PO (virtual or actual) are orthogonal or overlapping. Within each virtual PO, the paging narrow-band can be same as those within the previous determined PO, or a function of those paging narrow-bands within the previous determined PO.

Figure 12:
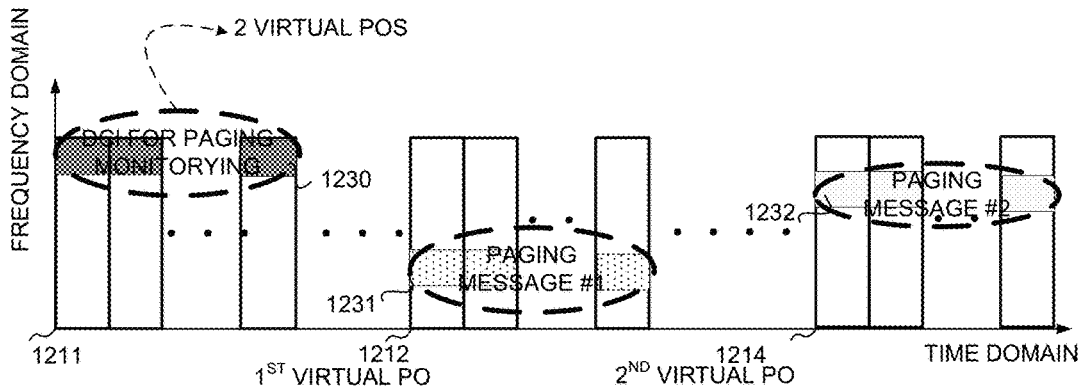
FIG. 12 illustrates an exemplary of paging transmission with M-PDCCH according to one embodiment of this invention.

FIG. 12 illustrates an exemplary of paging transmission with M-PDCCH according to one embodiment of this invention. In FIG. 12, the DCI indicates the total number of POs, for example two virtual POs. For the first paging message #0 1230 of the first actual PO, its starting point in time domain is starting point 1211. The UE does not known the position of the next repetition of paging message #0 1230. From the paging message #0 1230, the UE obtains some information about the starting point of the next repetition of paging message #0 1230. In one embodiment, the starting point 1212 is a logical value between starting point 1212 and starting point 1211, or the logical value between starting point 1212 and starting point 1211 is a function, which could be determined. At the starting point 1212, the UE could detect the paging narrow-band for itself, for example, paging message #1 1231. In one embodiment, the frequency location of paging message #1 1231 is the same as paging message #0 1230, in another novel aspect, the frequency location of paging message #1 1231 is different from paging message #0 1230, e.g. with a shift. The distance between the starting point 1214 and the starting point 1212 could be the same with the distance between starting point 1212 and starting point 1211. In one embodiment, the second virtual PO starts from the starting point 1214, and UE detects the paging narrow-band for itself, for example, paging message #1 1232.

Figure 13:
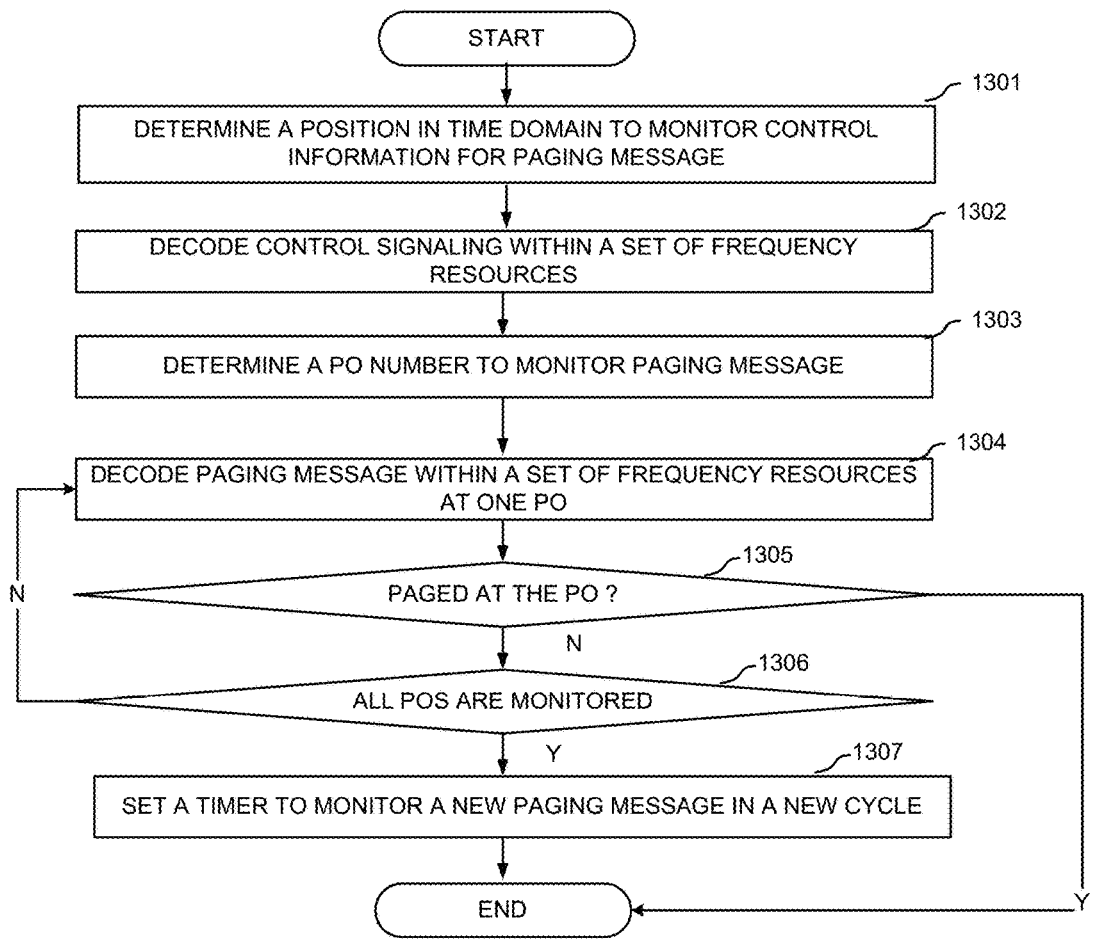
FIG. 13 illustrates an exemplary method flow of UE reception procedure according the embodiment of FIG. 12 of this invention.

FIG. 13 illustrates an exemplary method flow of UE reception procedure according the embodiment of FIG. 12 of this invention. The UE determines a position in time domain to monitor control information for paging message in step 1301. The UE decodes control signaling within a set of frequency resources in step 1302. Subsequently, the UE determines the number of POs within this cycle to monitor paging message in step 1303, the number of POs could be indicated in DCI with M-PDCCH. The UE decodes paging message within a set of frequency resources at the PO in step 1304, then UE checks if there it is paged at the PO in step 1305, if no, UE goes to step 1306 to determine if all the POs have been monitored in step 1306. If yes in step 1305, end the procedure. If no, the UE moves back to step 1304. If step 1306 determines yes, the UE sets a timer to monitor a new paging message in a new cycle in step 1307.

In another embodiment, additional virtual POs are indicated by higher layer message. The locations of all virtual POs are predefined. In one embodiment, time locations of virtual POs are a function of the actual PO. UEs perform irrelative decoding among all possible POs. Transmission window of paging message at each PO (virtual or actual) is orthogonal or overlap. Within each virtual PO, the paging sub-band can be same as those within the previous determined PO, or a function of those known paging narrow-band.

The paging narrow-bands are those narrow-bands within a set of bundled subframes starting from a (virtual or actual) PO under a repeated transmission mechanism. The PO is a starting point for CE UE to monitor paging message with a repetition number. Without repetition (repetition number is one), the paging message is only transmitted within a PO. In one embodiment, the paging message is transmitted from a PO in time domain within a paging window. The paging window comprises multiple discrete/contiguous subframes to guarantee an extended coverage (CE) of paging message. The length of paging window can be one subframe without repetition in time domain, or with repetitions within one subframe. Multiple paging windows can be accommodated within a (extended) paging cycle. The set of subframes within a PO window for paging repetition/transmission is indicated by a higher layer message, or specified. The paging message can be repeated within a subframe or within a limited number of subframes to reduce delay. In some embodiment of this invention, frequency hopping could be enabled to achieve diversity gain by transmitting message among multiple narrow-bands. In one case, the frequency resources hop at frequency domain among a determined paging narrow-band and other narrow-bands not configured/specified for paging. The positions of other narrow-bands are obtained by a predefined hopping rule, which is a function of at least subframe index, bundle index, UE ID. In yet another case, the frequency resources hop in frequency domain among multiple known paging narrow-bands. The hopping pattern is configured or predefined. For example, resources hop among the higher-layer configured narrow-bands one by one with time. Note that each narrow-band is used within a bundled set of subframes during frequency hopping. The bundled size can be one or more subframes.

Figure 14:
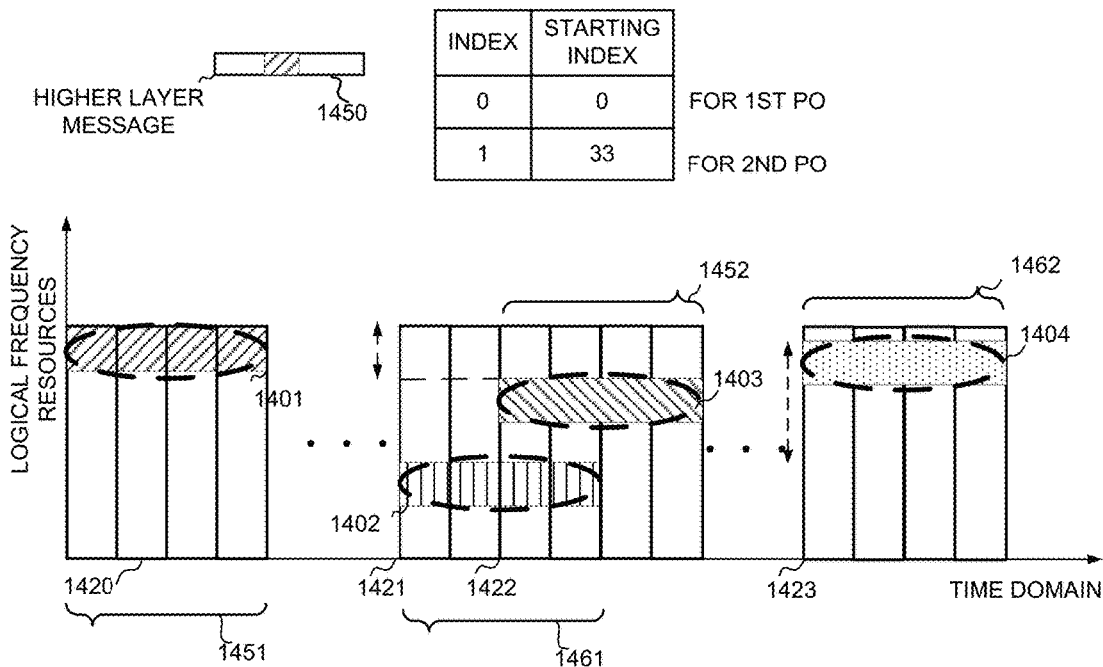
FIG. 14 illustrates the first exemplary of paging resources with frequency hopping according to one embodiment of this invention.

FIG. 14 illustrates the first exemplary of paging resources with frequency hopping according to embodiments of this invention. In FIG. 14, from the higher layer message 1450, UE obtains the frequency resources with a starting index POs. For example, for the first PO, a paging narrowband #0 starting from logical RB pair #0 is allocated. For the second PO, a paging narrow-band #1 starting from logical RB pair #33 is allocated. A paging message 1401 is transmitted from the first PO, i.e. starting point 1420 by a bundled repetition 1451 within paging narrow-band #0. Starting from starting point 1422, another bundled repetition 1452 of paging message 1403 is transmitted within narrow-band #1, which is obtained by adding a shift to paging narrow-band #0 in frequency domain. Another paging message 1402 starts from the second PO, i.e. starting point 1421 in time domain, and its first bundled repetition 1461 is within paging narrow-band #1. A bundled repetition 1462 of paging message 1404 is starting from starting point 1423 within a narrow-band #2. The narrow-band #2 is obtained by adding a shift value to paging narrow-band #1.

Figure 15:
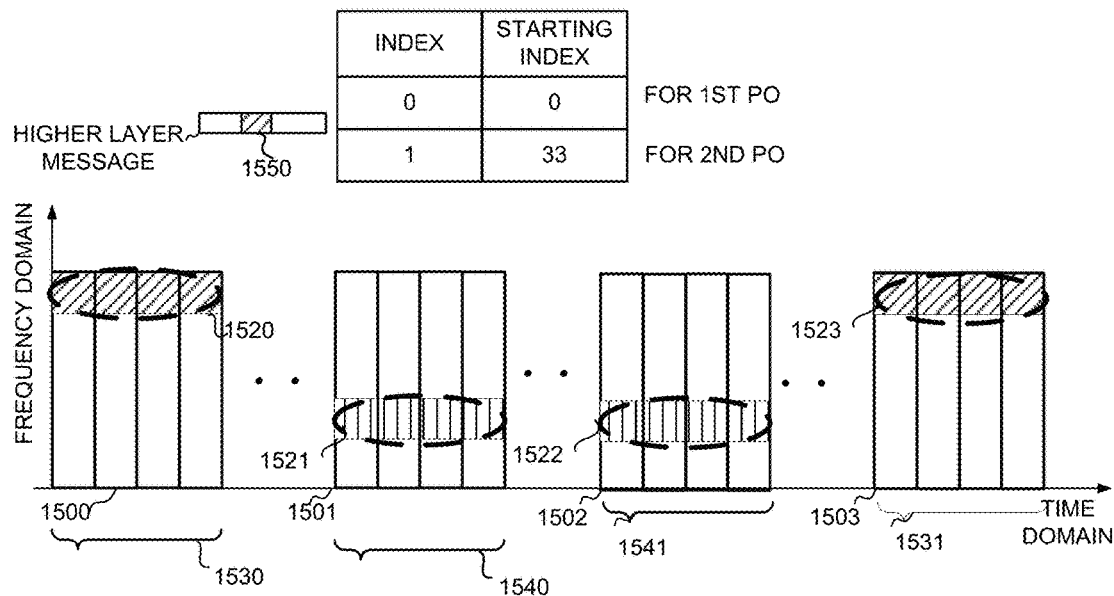
FIG. 15 illustrates the second exemplary of paging resources with frequency hopping according to one embodiment of this invention.

FIG. 15 illustrates the second exemplary of paging resources with frequency hopping according to one embodiment of this invention. Different from FIG. 14, resources for a paging message repetition are identical at all subframes in time domain. For example, a paging message 1520 is repeated by a number, i.e. the bundled repetition 1530 starts from the first PO 1500 within a paging narrow-band #0. Another bundled repetition 1531 of paging message 1523 starts from starting point 1503 at narrow-band #3, which has the same frequency location as paging narrow-band #0 for paging message 1520. At a second PO 1501, another paging message 1521 is transmitted. At the first bundled repetition 1540 of paging message 1521, paging narrow-band #1 is occupied for transmission. At another bundled repetition 1541 starting from starting point 1502 of paging message 1522 in narrow-band #2, narrow-band #2 is occupied for transmission, and frequency location of narrow-band #2 is the same as paging narrow-band #1 at frequency domain.

Figure 16:
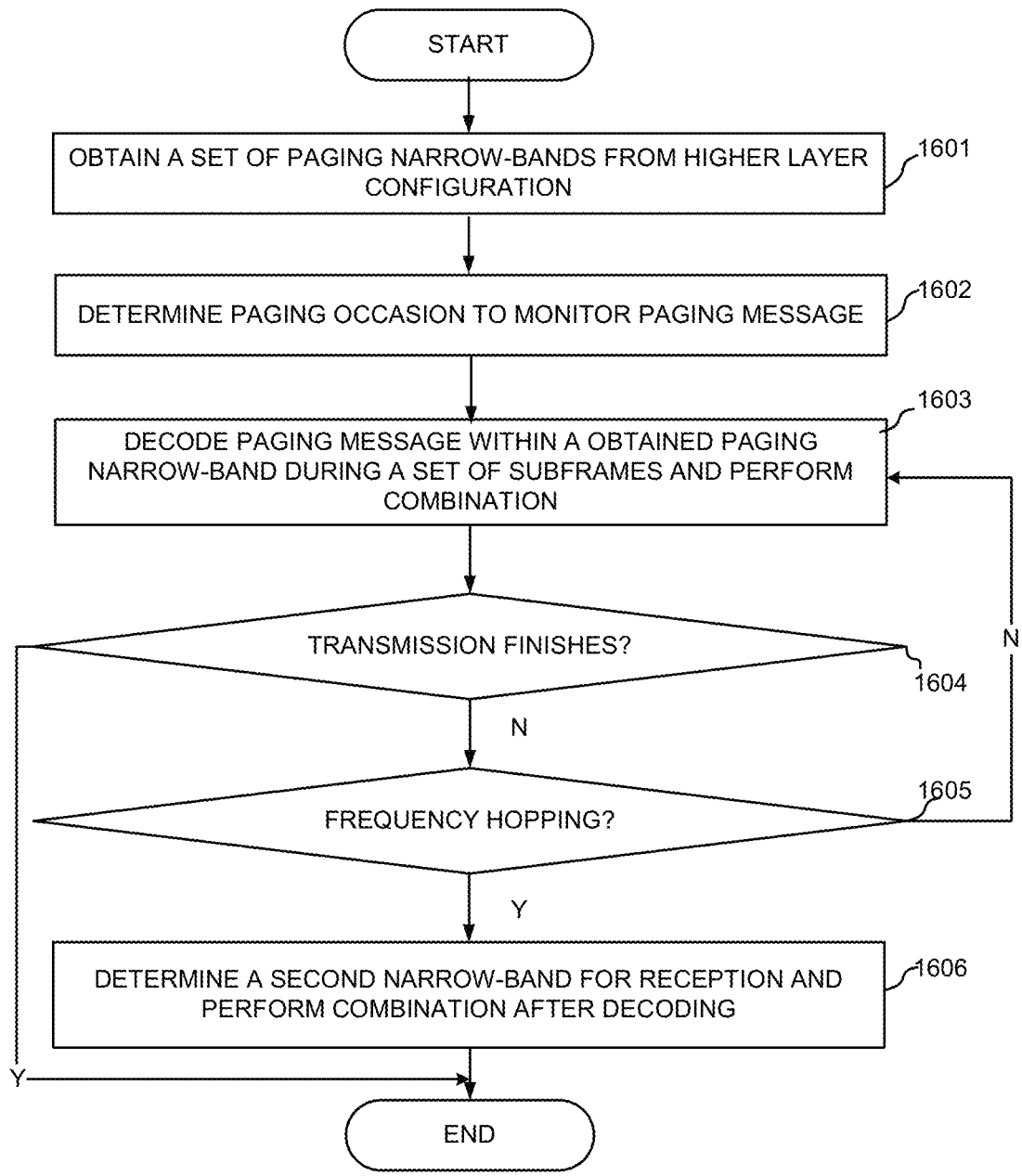
FIG. 16 illustrates an exemplary method flow of UE reception procedure according to one embodiment of this invention.

FIG. 16 illustrates an exemplary method flow of UE reception procedure according to one embodiment of this invention. First, in step 1601, UE obtains a set of paging narrow-bands from the high layer configuration. In step 1602, the UE determines the paging occasion to monitor the paging messages. The UE decodes the paging message within the obtained paging narrow-band during a set of subframes and perform combination in step 1603. The UE determines if the transmission of the paging message finishes in step 1604. If yes, then UE end the procedure, if not, then UE goes to step 1605 to check if the frequency hopping is enabled, if enabled, then UE goes to step 1606 to determine a second narrow-band for reception and perform combination after decoding. If there is no frequency hopping in step 1605, UE goes to step 1603 to decode paging message within the same obtained paging narrow-band during a set of subframes and perform combination, and then to determine if the transmission finishes in step 1604.

Figure 17:
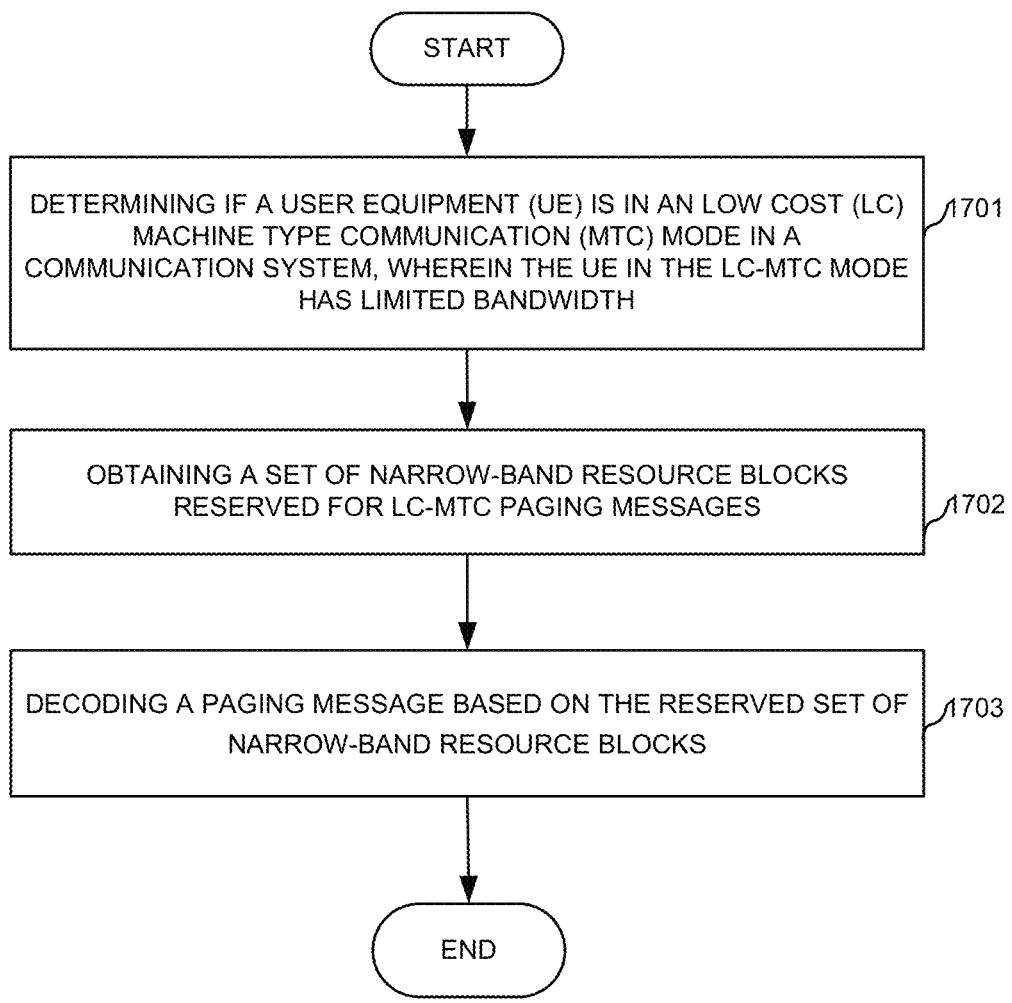
FIG. 17 shows an exemplary flow chart for a UE in the LC-MTC mode to decode a paging message in accordance with embodiments of the current invention.

FIG. 17 shows an exemplary flow chart for a UE in the LC-MTC mode to decode a paging message in accordance with embodiments of the current invention. At step 1701, the UE determines if the UE is in a low cost (LC) machine type communication (MTC) mode in a communication system, wherein the UE in the LC-MTC mode has limited bandwidth. Or UE determines if the UE operates in CE mode, which the UE is a normal UE. At step 1702, the UE obtains a set of narrow-band resource blocks reserved for LC-MTC paging messages used for LC MTC UE or normal UE in CE mode. At step 1703, the UE decodes a paging message based on the reserved set of narrow-band resource blocks.

Figure 18:
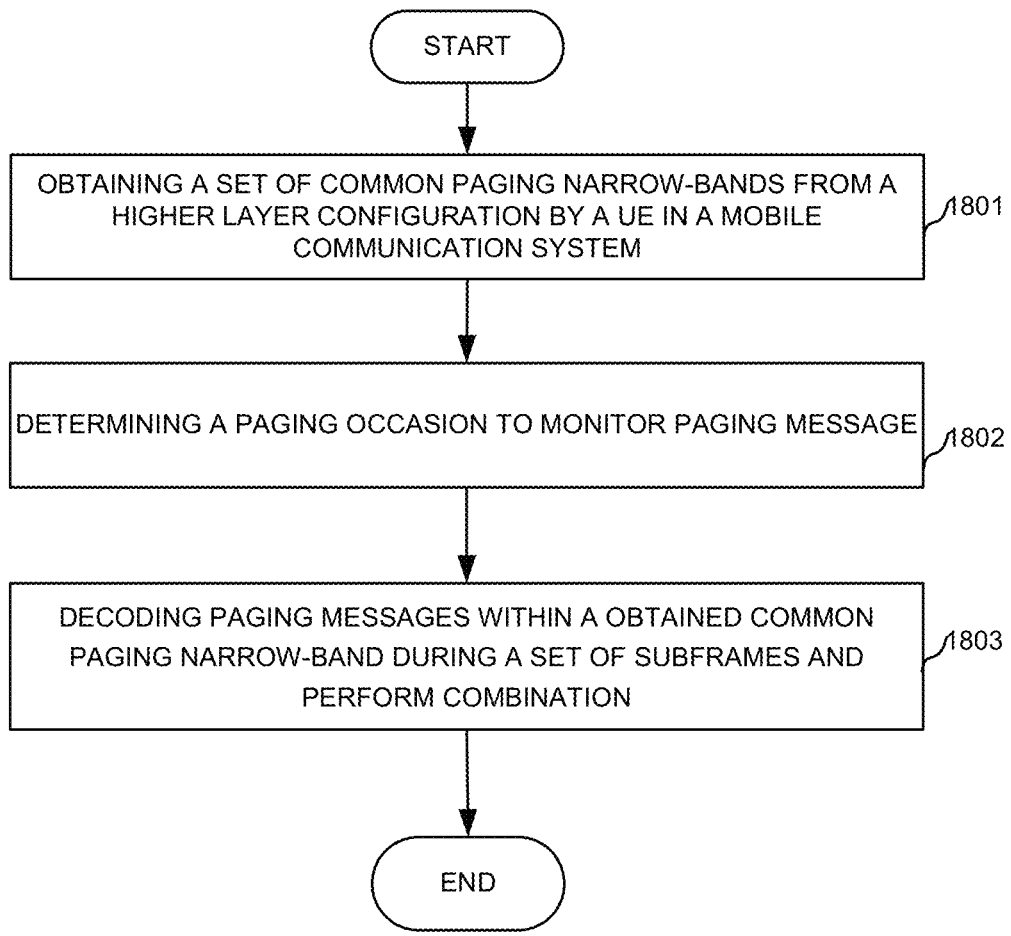
FIG. 18 shows an exemplary flow chart for a UE in the LC-MTC mode to detect POs in accordance with embodiments of the current invention.

FIG. 18 shows an exemplary flow chart for a UE in the LC-MTC mode to detect POs in accordance with embodiments of the current invention. At step 1801, the UE obtains a set of common paging narrow-bands from a higher layer configuration in a mobile communication system. At step 1802, the UE determines a paging occasion to monitor paging message. At step 1803, the UE decodes paging messages within the obtained common paging narrow-band during a set of subframes and perform combination.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method in a communication system comprising:
   determining whether a user equipment (UE) is in a low cost (LC) machine type communication (MTC) mode, wherein the UE is in LC MTC mode upon detecting one or more conditions comprising: the UE is an LC MTC device, and the UE is a normal UE in a coverage extension (CE) mode;
   obtaining a set of narrow-band resource blocks reserved for paging messages; and
   decoding a paging message based on at least one of the obtained set of narrow-band resource blocks and downlink control information, wherein the downlink control information is based on the obtained set of narrow-band resource blocks.

2. The method of claim 1, wherein the set of narrow-bands are obtained from a higher layer message.

3. The method of claim 2, further comprising:
   obtaining an MTC physical down link control channel (MPDCCH) search space based on the set of narrow-bands; and
   decoding the paging message after obtaining scheduling information within the MPCCH searching space.

4. The method of claim 3, wherein the MPDCCH searching space comprises a paging narrow-band, and the paging narrow-band is selected from the set of narrow bands based on a UE ID.

5. The method of claim 4, wherein the UE ID is a function of IMSI, S-TMSI, UE specific P-RNTI or multicast P-RNTI shared by a group of UEs.

6. The method of claim 5, wherein the group of UEs share the same coverage extension (CE) level.

7. The method of claim 1, wherein the higher layer message comprises one or more narrow-band resource blocks index for the paging message.

8. The method of claim 1, wherein before decoding a second paging message, further checking if frequency hopping is enabled by the UE.

9. The method of claim 8, wherein when the frequency hopping is enabled, obtaining another narrow-band under a hopping pattern.

10. A method in a mobile communication system comprising:
obtaining, by a user equipment (UE), a set of common paging narrow-bands from a higher layer configuration;
determining a paging occasion to monitor one or more paging messages, wherein the paging occasion is a starting point for paging messages indicated in a higher layer message; and
decoding the one or more paging messages within an obtained common paging narrow-band and performing combination of decoded subframes of the one or more paging messages.

11. The method of claim 10, further comprising: determining whether a frequency hopping is enabled.

12. The method of claim 10, further comprising checking whether a number of virtual paging occasion (PO) is indicated in downlink control information (DCI).

13. The method of claim 12, wherein if the number of virtual POs is indicated, obtaining the narrow-bands for the number of the virtual POs, and decoding a second paging message at one of the number of the virtual POs.

14. A user equipment (UE), comprising:
a transceiver that transmits and receives radio signals in a wireless network;
a memory; and
a processor coupled to the memory, the processor configured to detect whether the UE is in a low cost (LCU) machine type communication (MTC) mode, wherein the UE is in LC MTC mode upon detecting one or more conditions comprising: the UE is an LC MTC device, and the UE is a normal UE in a coverage extension (CE) mode;
obtain a set of narrow-band resource blocks reserved for LC-MTC paging messages; and
decode a paging message based on at least one of the reserved set of narrow-band resource blocks and downlink control information, wherein the down link control information is based on the reserved set of narrow-band resource blocks.

15. The UE of claim 14, wherein the set of narrow-bands are obtained from a higher layer message, wherein the higher layer comprises a narrow-band index.

16. The UE of claim 15, wherein the higher layer message, comprises the narrow-band index.

17. The UE of claim 14, wherein the processor is further configured to obtain an MTC physical down link control channel (MPDCCH) search space based on the set of narrow-bands and decode the paging message after obtaining scheduling information within the MPCCH searching space.

18. The UE of claim 17, wherein the MPDCCH searching space comprises a paging narrow-band, and the paging narrow-band is selected from the set of narrow bands based on a UE ID.

19. The UE of claim 14, wherein the processor is further configured to determine a paging occasion (PO) to monitor paging message and checks whether a number of virtual PO is indicated in the down link information.

* * * * *